United States Patent Office 3,577,370
Patented May 4, 1971

3,577,370
MODIFIER FOR PHENOLIC RESINS
Anthony J. Castro, Oak Park, Frederick S. Marsh, Chicago, Layton E. Kinnney, Villa Park, and Frank J. Fischl, Chicago, Ill., assignors to Armour Industrial Chemical Company, Chicago, Ill.
No Drawing. Filed Aug. 5, 1968, Ser. No. 749,946
Int. Cl. C08g 37/18
U.S. Cl. 260—19
8 Claims

ABSTRACT OF THE DISCLOSURE

Hydroxyphenylstearic acid-phenol copolymers with aldehyde bridging, useful with epoxy resins as coating compositions.

---

Heretofore the art has been concerned with developing synthetic phenolic resins which may be copolymerized with epoxy resins to form surface coatings exhibiting greater flexibility and chemical resistance. U.S. Pat. 3,324,059 and J. Am. Oil Chemists Soc., vol. 41, p. 30, March 1964 teach the formation of a low molecular weight homopolymer of hydroxyphenylstearic acid bridged by $CH_2$ from formaldehyde. The formaldehyde and hydroxyphenylstearic acid must be used in at least about 2:1 molar ratio respectively. The homopolymer formed may then be copolymerized with an epoxy resin to form a coating alleged to exhibit flexibility and chemical resistance. A serious drawback to such compositions has been that the phenolic resins are not very compatible in epoxy systems. Frequently the phenolic and epoxy resins must be co-reacted with additional ingredients such as a catalyst like benzyldimethylamine in order to secure compatible coatings and to form good coating films. Further, such compositions are not sufficiently hard or durable for the coating uses intended.

This invention, therefore, pertains to compositions which overcome many of the disadvantages experienced with prior art materials, including the above objections. The invention provides condensation products of phenol, formaldehyde and hydroxyphenylstearic acid and the compositions obtained by reaction of these condensation products with epoxy resins, which show superior compatibility in epoxy systems, increased hardness, and solvent resistance and which do not have to be co-reacted with additional ingredients to form good coating films. More specifically, this invention relates to phenolic resin compositions comprising the copolymer of hydroxyphenylstearic acid with phenol and an aldehyde such as formaldehyde, the molar ratio of aldehyde to hydroxyphenylstearic acid being about 30:1. It also pertains to epoxy resin compositions obtained by reaction of the phenolic resin composition with epoxy resins.

The compositions provided by the invention are applicable in numerous fields. They are useful in the manufacture of adhesives, coatings, films and cast thermosetting articles, and for other purposes.

Epoxy resins suitable for use in the compositions of the invention include a large number of liquid epoxy resins that are reaction products of polyhydric phenols with polyfunctional halohydrins and/or glycerol dichlorohydrin. These epoxy resins may be generally described as containing 1,2-epoxide groups. Desirable epoxy resins are commonly prepared as the condensation products of bisphenol A, identified also as bis(4-hydroxyphenol) dimethylmethane, and epichlorohydrin. A further generally used characterization of epoxy resins refers to their epoxy equivalent weight. The epoxy equivalent weight is the number of grams of resins which contain 1 gram-equivalent of epoxide. Preferred epoxy resins for blending with the hydroxyphenylstearic acid-phenol copolymer compositions of the present invention are commercial epoxy resins having an epoxy equivalent weight of about from 400 to 2000.

The hydroxyphenylstearic acid-phenol copolymer compositions of the invention may be formulated by combining phenol, hydroxyphenylstearic acid and an aldehyde such as formaldehyde, and heating in the presence of a catalyst until the reaction is substantially complete. Particularly preferred mole ratios of phenol:hydroxyphenylstearic acid:formaldehyde are 0.85:0.10:1 and 0.95:0.1:30. The catalyst may be alkaline or acidic and the reaction is preferably conducted in an inert atmosphere, such as nitrogen. After the condensation reaction is subntantially complete, the resin may be separated from the reaction mixture. The resins from the condensation reaction generallv are viscous amber liquids at room temperatures and fuse to brittle, dark solids at about 450° F. in less than one minute.

In the formation of the copolymer it appears that some to a substantial amount of the phenol is being replaced with hydroxyphenylstearic acid. It is generally desirable to use about from 5 mole percent and upwards of hydroxyphenylstearic acid, but about from 1 mole percent is suitable in some instances. The mole ratio of phenol to hydroxyphenylstearic acid may range about from 19:1 to 1:9; and about 1:9 or 10 mole percent of hydroxyphenylstearic acid is preferred.

Hydroxyphenylstearic acid for use in the resin compositions is readily available from commercial sources. Further, it may be prepared by the addition of phenol to oleic acid using a catalyst-solvent medium such as methanesulfonic acid. In addition, the hydroxyphenylstearic acid may be prepared from methyl oleate by known procedures.

The amount of aldehyde in the copolymer compositions is not particularly critical and may vary widely depending on the degree of hydroxy content desired.

Other aldehydes may be employed in place of the formaldehyde illustrated above. Generally, formaldehyde, acetaldehyde and furfural are desirable; however, any aldehyde providing hydroxy functional groups in condensation reactions with phenol or substituted phenol form synthetic thermosetting resins may be used.

Suitable catalysts for use in forming the phenolic resin compositions may be either alkaline, such as sodium potassium or ammonium hydroxides, or one of the organic bases; or acidic such as mineral acids like hydrochloric, phosphoric and sulfuric and organic acids like oxalic, acetic, propionic, etc.

The temperature for the phenol-formaldehyde-hydroxyphenylstearic acid reaction is not critical, and the reaction proceeds satisfactorily at reflux temperatures for the aqueous solution. Somewhat higher temperatures may me employed to speed up the reaction and somewhat lower temperatures may be employed.

The ratios of epoxy resin to the phenolic resin of the invention may be varied over a considerable range to produce the hard, flexible, solvent resistant condensation products of the invention. A preferred range is about from 1:1 to 3:1 parts by weight of epoxy resin to phenolformaldehyde-hydroxyphenylstearic acid resin to obtain preferred condensation products of the invention.

Coating products may be made by blending the epoxy resin with phosphoric acid and a solvent or solvent mixture which does not react with the two resins, such as Cellosolve acetate and xylene mixture, then adding the phenolic resin of the invention and heating. No alkaline catalyst is required in the reaction mixture.

The invention is still further illustrated by specific examples, which are not to be construed as imposing limitations upon the scope thereof. For comparison, Example 1 shows a standard phenolic system preparation, Example 3 shows a homopolymer of hydroxyphenylstearic acid preparation of the art, and Example 2 illustrates the phenolic copolymer of the invention. The phenolic-epoxy resin products obtained from each are compared in Example 4.

EXAMPLE 1

A mixture of 94.0 g. (1.00 mole) of phenol, 123.0 g. of 37% formaldehyde (1.5 mole), and 2.6 g. (0.15 mole) of barium hydroxide was heated at reflux temperature (70° C.) for three hours, coled and then neutralized with dilute sulfuric acid. It was reheated to 70–80° C. for four hours under aspirator, then poured off to give a yellow, opaque, viscous liquid resin.

EXAMPLE 2

A mixture of 79.9 g. (0.85 mole) of phenol, 56.4 g. (0.15 mole) of hydroxyphenylstearic acid, 123.0 g. of 37% formaldehyde (1.5 mole), 2.6 g. of barium hydroxide and 9.8 g. of potassium hydroxide to neutralize the acid was combined and stirred at reflux temperature (70° C.) for three hours, cooled and neutralized with dilute sulfuric acid. It was reheated to 60–70° C. for six hours under aspirator and then poured off. The product was an amber, hazy, viscous liquid resin.

EXAMPLE 3

A mixture of 60.4 g. (0.16 mole) of hydroxyphenylstearic acid, 26.0 g. (0.32 mole) of 37% formaldehyde (0.32 mole), and 0.128 g. (0.0032 mole) of sodium hydioxide was heated at reflux temperature with stirring under a nitrogen atmosphere for 48 hours. The product was extracted with ether acidified with dilute hydrochloric acid, washed with water until neutral, and then dried over magnesium sulfate. The ether solvent was then removed. The product was a clear, viscous, amber liquid resin.

EXAMPLE 4

The products of Examples 1, 2, and 3 were incorporated into a coating system with a commercial epoxy as follows: To 57 parts of solvent (mixture of 1:1 of Cellosolve acetate:xylene) was added three parts of 85% phosphoric acid and 636 parts of epoxy resin (Dow epoxy resin 664) (55% in the solvent). The ingredients were thoroughly mixed and allowed to stand overnight; and 300 parts of the product from Examples 1, 2, or 3 and four parts SR 82 (silicon oil) were added to give a formulation containing 65% solids. The resulting formulation was applied to steel panels, which were then baked at 190° C. for thirty minutes. Properties of the films, if any, were determined.

The phenol-formaldehyde resin of Example 1 was found to be miscible in the coating system, giving an opaque liquid which did not separate out. Properties of the film are set forth in Table 1.

The phenol-formaldehyde-hydroxyphenylstearic acid resin of Example 2 resulted in a compatible, completely miscible coating film. The properties of this film are also set forth in Table I.

The hydroxyphenylstearic acid-formaldehyde homopolymer of Example 3 was incompatible even at 40% solids. To secure a compatible coating, 5 ml. of benzyldimethylamine had to be added to the phenolic resin and the epoxy resin mixture and the mixture heated for five hours at 100° C. The resulting film had the properties set forth in Table I.

TABLE I.—EPOXY RESIN-PHENOLIC RESIN FILM PROPERTIES

| | Phenolic resin from Example— | | | |
|---|---|---|---|---|
| | 1 | 2 | 3 (40%) | 3 (co-reacted) |
| Impact: | | | | |
| Direct | 40 | 30 | 40 | 40. |
| Indirect | 40 | 40 | 40 | 40. |
| ⅛ inch bend | O.K. | O.K. | O.K. | O.K. |
| Sward | 56 | 84 | 34 | 64. |
| MIBK* resistance rub test | Fair | Good | Poor | Poor. |
| General appearance | Yellow, even. | Brown, even. | Hazy, rough. | Clear, smooth. |

EXAMPLE 5

In another comparative example hydroxyphenylstearic acid-phenol copolymer was incorporated into a standard phenolic recipe, as follows:

Resin 1 (Control)

| | G. |
|---|---|
| Phenol (1.0 mole) | 94.0 |
| Formaldehyde solution (37%, 1.5 mole) | 123.0 |
| Ba (OH)$_2$ | 2.6 |

Resin 2

| | |
|---|---|
| Phenol (0.95 mole) | 89.3 |
| Hydroxyphenylstearic acid (0.05 mole) | 18.8 |
| Potassium hydroxide | 3.3 |
| Barium hydroxide | 2.6 |
| Formaldehyde solution (37%, 1.5 mole) | 123.0 |

Resin 3

| | |
|---|---|
| Phenol (0.85 mole) | 79.9 |
| Hydroxyphenylstearic acid (0.15 mole) | 56.4 |
| Potassium hydroxide | 9.8 |
| Barium hydroxide | 2.6 |
| Formaldehyde solution (37%, 1.5 mole) | 123.0 |

All resins were heated until they exhibited a cure at 190° C. of 12–15 seconds and formulated into a coating as follows:

Epoxy resin (925 equiv.)—29.15 gms.
Xylene—11.95 gms.
Cellosolve acetate—20.25 gms.
Phenolic resin—25.0 gms.
Flow agent—.33 gms.
Phosphoric acid—.25 gms.
Methyl isobutyl ketone—20 ml.

Solutions containing hydroxyphenylstearic acid modified resin were soluble, gave improved film appearance and solvent resistance.

While this invention has been described with respect to specific embodiments of hydroxyphenylstearic acid-phenol copolymer compositions and compositions obtained by reaction of the condensation of the products with epoxy resins, such are by way of illustration and not in limitation; and it is to be understood that variations and modifications thereof obvious to those skilled in the art may be made without departing from the spirit or scope of this invention.

What is claimed is:

1. Phenolic resin compositions comprising hydroxyphenylstearic acid-phenol copolymer and an aldehyde selected from the group consisting of formaldehyde, acetaldehyde and furfural, the mole ratio of phenol to hydroxyphenylstearic acid being about from 19:1 to 1:9, and the ratio of aldehyde to hydroxyphenylstearic acid being about 10:1 to 30:1.

2. The composition of claim 1 wherein said aldehyde is formaldehyde.

3. The composition of claim 1 wherein said aldehyde is formaldehyde, and the ratio of aldehyde to hydroxyphenylstearic acid is about 30:1.

4. Epoxy resin composition comprising an epoxy resin having an epoxy equivalent weight of about from 400 to 2000, the phenolic resin of claim 1, and wherein the weight ratio of epoxy resin to phenolaldehyde-hydroxyphenylstearic acid is about from 1:1 to 3:1.

5. The composition of claim 4 wherein the phenolic resin is hydroxyphenylstearic acid-phenol copolymer and formaldehyde, the mole ratio of aldehyde to hydroxyphenylstearic acid being about 10:1 to 30:1.

6. The process of making hydroxyphenylstearic acid-phenol copolymer compositions comprising combining phenol, an aldehyde selected from the group consisting of formaldehyde, acetaldehyde and furfural, and hydroxyphenylstearic acid, and heating in the presence of a catalyst; the mole ratio of phenol to hydroxyphenylstearic acid being about from 19:1 to 1:9 and the mole ratio of aldehyde to hydroxyphenylstearic acid being about 10:1 to 30:1.

7. The process of claim 6 wherein said aldehyde is formaldehyde.

8. The process of claim 7 wherein the ratio of aldehyde to hydroxyphenylstearic acid is about 30:1.

References Cited
UNITED STATES PATENTS

| | | | |
|---|---|---|---|
| 3,031,421 | 4/1962 | Boyer et al. | 260—19 |
| 3,108,978 | 10/1963 | McNaughtan | 260—19 |
| 3,324,059 | 6/1967 | Scholnick et al. | 260—831 |

HOSEA E. TAYLOR, Primary Examiner

W. E. PARKER, Assistant Examiner

U.S. Cl. X.R.

117—161; 260—57, 831